Patented June 26, 1934

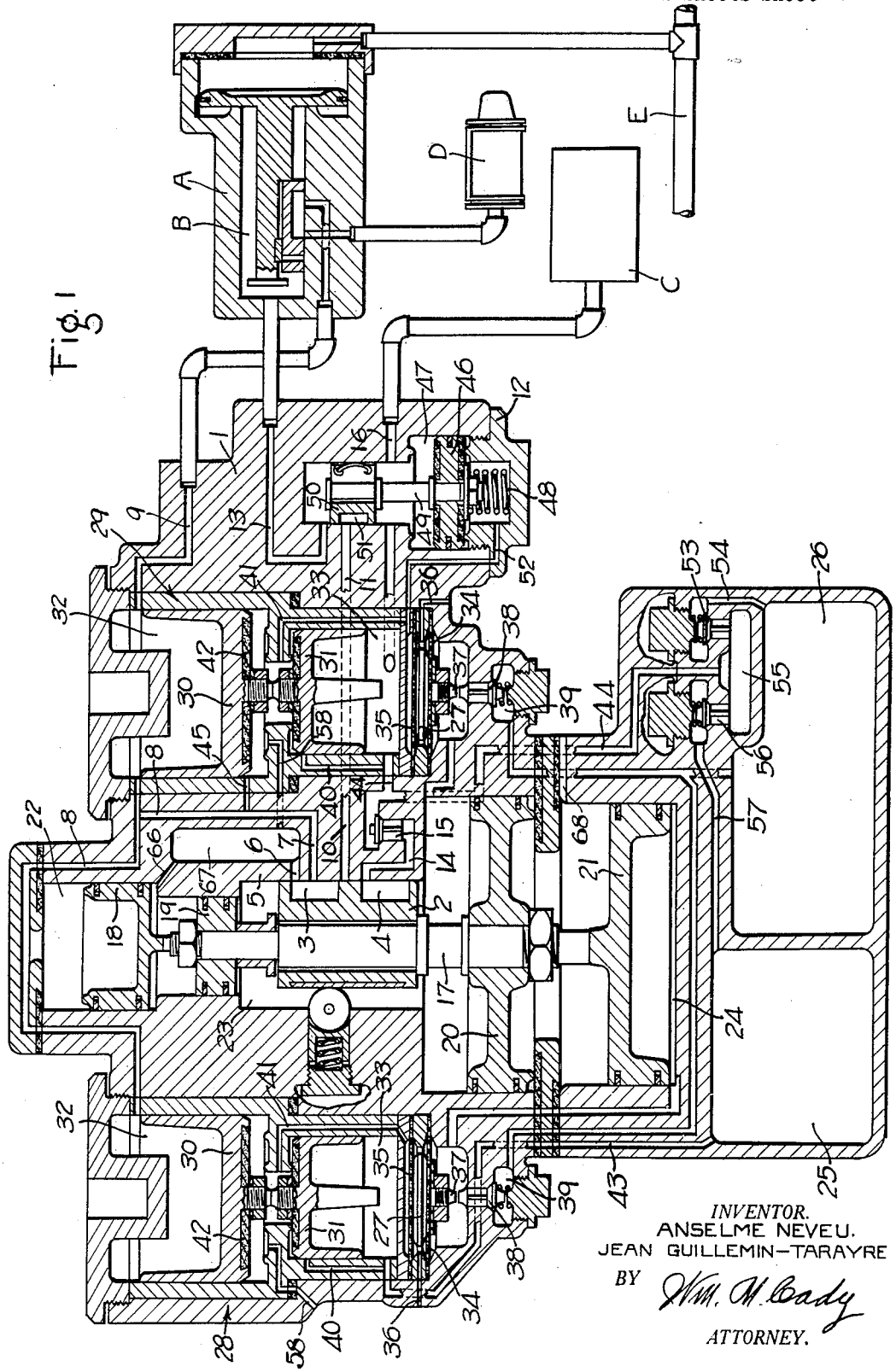

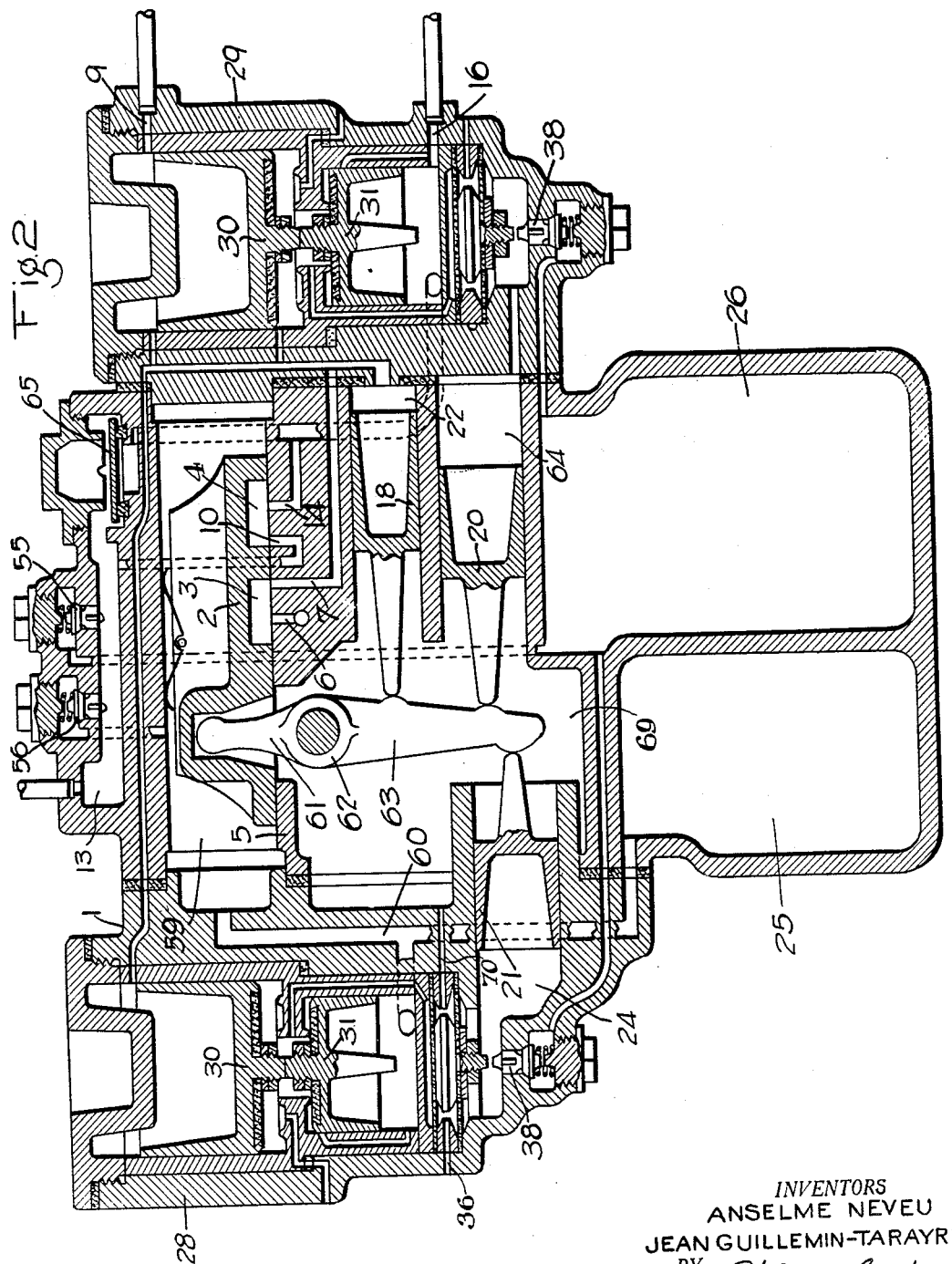

1,964,072

UNITED STATES PATENT OFFICE 1,964,072

FLUID PRESSURE BRAKE

Anselme Neveu, Livry-Gargan, and Jean Guillemin-Tarayre, Villemomble, France, assignors to Westinghouse Air Brake Company, Wilmerding, Pa., a corporation of Pennsylvania Application December 4, 1931, Serial No. 578,960
In Great Britain December 12, 1930

24 Claims. (Cl. 303—74)

This invention relates to fluid pressure brakes and more particularly to a valve device operative upon an increase in brake pipe pressure to effect a graduated release of the brakes.

Various forms of valve devices for effecting a graduated release of the brakes have heretofore been proposed, such for example as shown and described in my pending application, Serial No. 507,820, filed January 10, 1931, in which form a graduated release of the brakes is adapted to be effected in accordance with the degree of restoration of brake pipe pressure and auxiliary reservoir pressure toward a constant pressure acting in a control reservoir which is adapted to be maintained charged to the standard pressure carried in the brake pipe.

In the above mentioned pending application, the controlling pressures of the auxiliary reservoir, brake cylinder, and control reservoir are arranged to act continuously upon diaphragm pistons or other movable abutments and there is a possibility of continuous leakage of fluid under pressure past these abutments unless the abutments are relatively tight fitting, but abutments of this character are open to the disadvantage that they are relatively insensitive, so that even if all of the risk of leakage is eliminated, the valve is liable to be somewhat sluggish and unreliable in operation.

One object of the invention is to provide an improved graduated release valve device which will obviate the above undesired characteristics and which will be sensitive and reliable in operation.

This object is attained by arranging for the pistons or other abutments operating the graduated release control valve to be subject to the necessary controlling pressure only while a graduated release of the brakes is actually being effected. Furthermore, the controlling pressure of the auxiliary reservoir and control reservoir to which the abutments are subjected, are arranged to be reduced pressures proportional to the auxiliary reservoir and control reservoir, these reduced pressures being automatically maintained at their proper value in spite of leakage past the abutments or otherwise.

It will thus be seen that the abutments may be of any suitable type or construction adapted to ensure sensitiveness and reliability in operation, since not only is the period during which leakage can occur limited to the duration of the graduated release, but the pressures actually involved are reduced and provision is made for their automatic maintenance at the proper values.

In the accompanying drawings; Fig. 1 is a diagrammatic view, mainly in section, of a fluid pressure brake equipment embodying my invention; and Fig. 2 is a diagrammatic view, mainly in section, of a graduated release valve device embodying a modified form of my invention.

As shown in Fig. 1 of the drawings, the fluid pressure brake equipment comprises a graduated release valve device 1, a triple valve device A, an auxiliary reservoir C, a brake cylinder D, and a brake pipe E.

The graduated release valve device comprises a casing or body, the central portion of which contains the graduated release control valve proper and its operating mechanism, said control valve comprising a slide valve 2 contained in a chamber 23 and movably mounted on a suitable seat 5. The slide valve 2 is provided with two cavities 3 and 4, the cavity 3 adapted to control communication between two ports 6 and 7 in the slide valve seat 5, while the cavity 4 is adapted to control communication between two ports 10 and 14 in said slide valve seat.

The slide valve 2 is rigidly connected to a vertical piston stem 17 on which are mounted four alined pistons or abutments 18, 19, 20 and 21 adapted to move in corresponding cylinders formed in the casing or body.

The piston 18 is open at its upper side to a chamber 22 and the next lower piston 19 is open at its opposite side to valve chamber 23, the chamber formed between said pistons being at all times in communication with the atmosphere through a passage 66 and the atmospheric opening 67. The piston 20 is open at one side to valve chamber 23 while the piston 21, which is slightly smaller in area than piston 20, is open at its lower side to a chamber 24, the chamber formed intermediate the pistons 20 and 21 being at all times vented to the atmosphere through a passage 68.

At one side of the graduated release control valve device is a control reservoir pressure reducing valve device 28, while on the opposite side of the graduated release control valve device is an auxiliary reservoir pressure reducing valve device 29.

The pressure reducing valve devices 28 and 29 are similar in construction, each comprising a larger piston 30 and a smaller piston 31 arranged co-axial with one another and adapted to move in co-axial cylinders 32 and 33 arranged vertically one above the other. The lower face of the larger piston 30 and the upper face of the smaller piston 31 are each provided with a gasket 42 adapted to engage with a corresponding annular seat rib formed at the base and top of cylinders 32 and 33 respectively.

Each of the pressure reducers 28 and 29 also comprises a spring seated supply valve 38, and a larger diaphragm 34 and a smaller diaphragm 35 for controlling said supply valve. Said diaphragms are spaced by a member 27 securing the diaphragms together, the member 27 being provided with a stem 37 extending through and below the lower diaphragm 34 and adapted to engage the stem of said supply valve. The space between said diaphragms is at all times open to the atmosphere through a passage 36.

Arranged underneath the piston chamber 24 and preferably forming a part of the body 1 are two compartments or chambers 25 and 26, the chamber 25 constituting the control reservoir of the apparatus and the chamber 26 the supplementary reservoir.

Contained in the body 1 is a cut-off valve device 12 comprising a piston 46 adapted to move in a vertical cylinder 47. The piston 46 is provided with a valve stem 49 for operating a slide valve 50 which is contained in a chamber always open to the auxiliary reservoir C through passage 16. A spring 48 in the chamber at the lower side of piston 46 is provided to urge said piston and the slide valve 50 upwardly.

The triple valve device may be of any of the usual well known constructions adapted upon an increase in pressure in brake pipe E to supply fluid under pressure to valve chamber B from whence fluid under pressure is adapted to be supplied to the auxiliary reservoir C in accordance with the operation of the graduated release valve device 1 as will hereinafter be described. At the same time as fluid under pressure is supplied to valve chamber B, the triple valve device is also adapted to connect the brake cylinder D to passage 9 in the graduated release valve device 1 in order to effect a release of the brakes after an application, while upon a reduction in brake pipe pressure, the triple valve device is adapted to supply fluid under pressure from an auxiliary reservoir C to the brake cylinder D to effect an application of the brakes. The passage 9 through which the release of fluid under pressure from the brake cylinder D is effected is connected to the usual brake cylinder exhaust port in the triple valve device. As the operation of this simple form of triple valve device is so well known, it is deemed unnecessary to hereinafter provide a more detailed description.

From the above description of parts, it will be noted that the movable parts of the graduated release valve device 1 are arranged to operate in a vertical plane. When the system is void of fluid under pressure, as well as after effecting a release of the brakes as will be hereinafter described, the weight of the pistons 18, 19, 20 and 21 is adapted to move the slide valve 2 downwardly, due to gravity, to the normal position shown in the drawings. Also, the spring 48 is adapted to hold the cut-off valve piston 46 and slide valve 50 in their upper position, in which position passages 11 and 13 are connected through cavity 51 in said slide valve.

In operation, to initially charge the brake equipment with fluid under pressure, fluid under pressure is supplied to the brake pipe E in the usual manner and flows from thence to the triple valve device A which operates to supply fluid under pressure to valve chamber B. From chamber B fluid under pressure flows to passage 13 leading to the seat of the cut-off valve slide valve 50. As the chamber containing said slide valve is at this time void of fluid under pressure, the pressure of fluid in passage 13 acts to unseat said slide valve and flow from said passage to the valve chamber at the upper side of piston 6 and from thence through passage 16 to the auxiliary reservoir C.

Piston chambers 32 at the upper side of pistons 30 and chamber 22 at the upper side of piston 18 are connected together by passage 8 and are vented through said passage, port 7, cavity 3 in the graduated release slide valve 2, port 6 and through the atmospheric passage 67.

In the release position of the triple valve device A, the brake cylinder D is connected through passage 9 to piston chamber 32 and is therefore also vented through the communication just described.

Fluid under pressure supplied to the slide valve chamber of the cut-off valve device 12 and from thence through passage 16 to the auxiliary reservoir C also flows from said chamber to chamber 33 at the lower side of piston 31 in the auxiliary reservoir pressure reducer 29. Since chamber 32 at the upper side of piston 30 is at this time vented to the atmosphere, the pressure of fluid in chamber 33 moves the pistons 30 and 31 of the auxiliary reservoir pressure reducer 29 to their upper position, in which position the chamber at the lower side of the cut-off valve piston 46 is open to the atmosphere through passages 52 and 41, through the chamber at the lower side of piston 30 in the auxiliary reservoir pressure reducer 29, through passage 58 and from thence through the atmospheric passage 67. The venting of the chamber at the lower side of the cut-off valve piston 46 permits the pressure of fluid acting on the opposite side to move said piston and the slide valve 50 to the position shown in the drawing in which passage 13 is opened to the cut-off valve chamber. From chamber 33, at the lower side of piston 31, fluid under pressure flows through passage 44 to a chamber 55 and from thence past a check valve 53 and through passage 54 to the supplementary reservoir 26 and also from chamber 55 past a check valve 56 and through passage 57 to the control reservoir 25, thereby charging said reservoirs to brake pipe pressure.

Fluid at the pressure obtained in the control reservoir 25 flows through passage 43 to chamber 33 at the lower side of piston 31 in the control reservoir pressure reducing valve device 28, and since the chamber 32 at the upper side of piston 30 is vented to the atmosphere through passage 8, the pressure of fluid in chamber 33 moves the pistons 31 and 30 to the position shown in the drawings.

With the pistons 30 and 31 of the pressure reducing valve devices 28 and 29 in their upper position, the chambers at the upper side of the smaller diaphragms 35 are vented through passages 41, past the lower end of the unseated pistons 30 and through passages 58 leading to the atmosphere.

With the smaller diaphragms 35 thus subject on opposite sides to atmospheric pressure, the supply valves 38 are seated so as to prevent flow of fluid under pressure from valve chambers 39 which are at all times open to the supplementary reservoir 26. The chamber below the larger diaphragm 34 in the control reservoir reducing valve device 28 communicates with the control chamber 24 and both of said chambers are normally vented to the atmosphere by way of leakage past the piston 21 to the chamber at the upper side of said piston and thence through passage 68 to the atmosphere. The chamber at the lower side of the larger diaphragm 34 in the auxiliary reservoir pressure reducer 29 communicates with valve chamber 23 and both of these chambers are vented by leakage past the piston 19 to the chamber above said piston and from thence through passage 66 to the atmospheric opening 67. As the volume of the control chamber 24 and diaphragm chamber connected thereto, and also the valve chamber 23 and connected diaphragm chamber is quite small, the venting of fluid under pressure from said chambers by leakage, as above described, provides for satisfactory operation of the device as will be later described.

In order to effect an application of the brakes, fluid under pressure is vented from brake pipe E and causes the triple valve device A to operate in the usual well known manner to supply fluid under pressure from the auxiliary reservoir C and triple valve chamber B to the brake cylinder D, fluid under pressure flowing from the auxiliary reservoir C to the triple valve chamber B through passage 16, the valve chamber at the upper side of the cut-off valve piston 46, and from thence through passage 13.

To effect a release of the brakes after an application, fluid under pressure is supplied to brake pipe E and from thence to the triple valve device A, operating said triple valve device to supply fluid under pressure from said brake pipe to the triple valve chamber B for charging the auxiliary reservoir C, and also to connect the brake cylinder D to passage 9 in the graduated release valve device.

Fluid at brake cylinder pressure supplied to passage 9 in the graduated release valve device flows to chamber 32 in the auxiliary reservoir pressure reducer 29 and from said chamber through passage 8 to chamber 22 at the upper side of the control valve piston 18 and also to chamber 32 at the upper side of the control reservoir pressure reducer 28. Fluid at brake cylinder pressure also flows from passage 8 through port 7 to the seat of the control valve slide valve 2 and since said slide valve is at this time in the position shown in the drawings, passage 7 is open to the atmosphere through cavity 3 in said slide valve, passage 6 and atmospheric passage 67 so that fluid under pressure is vented from the brake cylinder to the atmosphere.

Fluid at brake cylinder pressure acting in chambers 32 at the upper side of pistons 30, moves said pistons and the pistons 31 to their lower position. In the lower position of the auxiliary reservoir pressure reducer pistons 30 and 31, fluid under pressure supplied from the auxiliary reservoir C through passage 16 and the valve chamber at the upper side of the cut-off valve piston 46 to chamber 33 at the lower side of the piston 31 flows from said chamber through passages 44 and 40 to the upper side of said piston and then through passages 41 and 52 to the chamber at the upper side of the small diaphragm 35 and also to the chamber at the lower side of the cut-off valve piston 46. The fluid pressures acting on the opposite sides of the cut-off valve piston 46 being now equal, spring 48 moves said piston and slide valve 50 to their upper position in which passage 13 is connected through cavity 51 to passage 11 and port 10 leading to the seat of the control slide valve 2.

Fluid under pressure supplied from the auxiliary reservoir C to the chamber at the upper side of the smaller diaphragm 35 deflects the diaphragms 35 and 34 downwardly unseating valve 38 which permits fluid under pressure to flow from the supplementary reservoir 26 through valve chamber 39 to the chamber at the lower side of the larger diaphragm 34 and from thence to the control valve chamber 23 between pistons 19 and 20. Fluid under pressure is thus supplied past the valve 38 until the pressure obtained in valve chamber 23 and acting on the diaphragm 34 overcomes the actuating pressure acting on diaphragm 35, at which time the spring acting on valve 38 acts to seat said valve. Since diaphragm 34 is of larger area than diaphragm 35, it will be evident that the pressure obtained in valve chamber 23 and required to actuate diaphragms 34 and 35 to permit seating of valve 38 is less than the actuating pressure supplied to the chamber at the upper side of diaphragm 35 for unseating said valve. Further, if there be leakage of fluid from valve chamber 23, the consequent reduction in pressure on diaphragm 34 permits the pressure of fluid acting on diaphragm 35 to unseat valve 38 and supply more fluid to chamber 23 to compensate for the loss of fluid from said chamber due to leakage. In this manner, a predetermined relation is maintained between the pressure of fluid in the auxiliary reservoir acting on diaphragm 35 and the pressure of fluid acting on diaphragm 34 even though there be leakage of fluid from the chamber at the lower side of diaphragm 34.

The control reservoir pressure reducer 28 operates in the same manner as the auxiliary reservoir pressure reducer 29. The movement of the pistons 30 and 31 to their lower position supplies fluid under pressure from the control reservoir 25 through passages 43 and 40, through the chamber at the upper side of piston 31 and from thence through passage 41 to the chamber at the upper side of diaphragm 35. Diaphragm 35 of the control reservoir pressure reducer is thereby deflected and unseats the valve 38 past which fluid under pressure is supplied from the supplementary reservoir 26 through valve chamber 39 to the chamber at the lower side of the larger diaphragm 34 and from thence to the control reservoir chamber 24 at the lower side of the control piston 21. Now when the pressure acting in chamber 24 and on the larger diaphragm 34 is increased to a degree sufficient to overcome the actuating pressure acting on diaphragm 35, said diaphragms are deflected upwardly, permitting the valve 38 to seat and prevent further flow of fluid under pressure to the control chamber 24. The valve 38 will be operated to supply fluid under pressure to chamber 24 as required to maintain the pressure in said chamber against leakage, since any reduction in pressure in said chamber is effective on the diaphragm 34 and will permit the actuating pressure on diaphragm 35 to unseat the valve 38.

It will now be seen that by the operation of the pressure reducer diaphragms 34 and 35 and the valves 38, and due to the fact that the diaphragms 34 are of larger area than the diaphragms 35, the pressures obtained in the valve chamber 23 and control chamber 24 are reduced and proportional to the pressures acting in the auxiliary reservoir C and control reservoir 25, and on account of the supply of fluid under pressure to chambers 23 and 24 being obtained from the supplementary reservoir 25, the pressure in both of said chambers is maintained proportional to the auxiliary reservoir and control reservoir pressures during the releasing action even though there be leakage from chambers 23 and 24.

At the beginning of the releasing operation, the control valve pistons 18, 19, 20 and 21 and the slide valve 2 are in the positions shown in the drawings, in which position fluid under pressure is released from the brake cylinder C by way of cavity 3 in said slide valve, and the auxiliary reservoir charging port is lapped. Consequently, the reduced pressure obtained in valve chamber 23 is proportional to the pressure to which the auxiliary reservoir pressure was reduced in effecting an application of the brakes. Now, just as soon as the proper reduced pressure is obtained in the control chamber 24, said pressure acting on piston 21 overcomes the reduced pressure in chamber 23 acting on the differential areas of pistons 19 and 20 and the brake cylinder pressure acting on piston 18, and moves said pistons and slide valve 2 upwardly to an intermediate position, in which position a cavity 4 connects port 10 to port 14. Port 10 is supplied with fluid under pressure from the triple valve chamber B by way of cavity 51 in the cut-off valve slide valve 50, so that fluid under pressure is permitted to flow from said port through cavity 4 and past the check valve 15 to passage 44 and from thence through chamber 33 at the lower side of piston 31 and passage 16 to the auxiliary reservoir C.

At the same time as fluid under pressure is supplied to the auxiliary reservoir C by way of the check valve 15 and passage 44, in the intermediate position of the graduated release control valve, fluid under pressure also flows from said passage through passage 40, the chamber at the upper side of piston 31 of the auxiliary reservoir pressure reducer 29 and through passage 41 to the chamber at the upper side of the diaphragm 35. The diaphragm 35 of the auxiliary reservoir pressure reducer is thereby actuated by the increase in auxiliary reservoir pressure to unseat the valve 38 and supply fluid under pressure from the supplementary reservoir 26 to valve chamber 23, the increase in pressure in chamber 23 acting on the larger area of diaphragm 34 to permit the valve 38 to seat when the pressure in the valve chamber 23 is increased an amount proportional to the increase in auxiliary reservoir pressure.

In the intermediate position of the slide valve 2, cavity 3 maintains communication between port 7, which communicates with the brake cylinder D by way of the triple valve device A, and the atmospheric port 6, and so long as the brake pipe pressure, auxiliary reservoir pressure and pressure in valve chamber 23 are steadily increasing, and the brake cylinder pressure in chamber 22 is reducing at the proper rate relative to the rate of increase in pressure in chamber 23, an equilibrium of forces is maintained on the control valve pistons 18, 19, 20 and 21 such that said pistons and slide valve 2 remain in the intermediate position. However, if the rate of increase in pressure in the auxiliary reservoir C, and the consequent proportionate increase in valve chamber 23, should be too rapid as compared to the rate of reduction in brake cylinder pressure acting in the control valve piston chamber 22 on piston 18, the pressure in chamber 23 acting on the differential areas of pistons 19 and 20 plus the brake cylinder pressure acting in chamber 22 on piston 18, moves the pistons 18, 19, 20 and 21 and slide valve 2 downwardly against the opposing control pressure in chamber 24. The downward movement of slide valve 2 continues until the auxiliary reservoir charging port 10 is lapped by the slide valve 2, but communication is maintained between ports 6 and 7 through cavity 3 so that fluid under pressure may continue to be vented from the brake cylinder D. Then when the brake cylinder pressure, acting in the control valve piston chamber 22, is reduced to a degree proportionate to the increase in auxiliary reservoir pressure, the constant reduced pressure in the control chamber 24 moves the pistons 18, 19, 20 and 21 and slide valve 2 upwardly to the intermediate position, in which position fluid under pressure is again supplied to the auxiliary reservoir C at the same time as fluid under pressure is vented from the brake cylinder. On the other hand, in the event of brake cylinder pressure acting in chamber 22 on the control piston 18 reducing too rapidly out of proportion to the rate of increase in auxiliary reservoir pressure, the constant control pressure in chamber 24 moves the pistons 18, 19, 20 and 21 and slide valve 2 upwardly from the intermediate position against the opposing and too rapidly reducing brake cylinder pressure acting on piston 18. This upward movement of slide valve 2 laps the brake cylinder release port 7 so as to interrupt the release of brakes, but maintains the communication between ports 10 and 14 through cavity 4 in the slide valve 2 so that charging of the auxiliary reservoir C continues. Then as soon as the auxiliary reservoir pressure is increased to the proper relation to the reduced brake cylinder pressure, the pressure in chamber 23, which increases in proportion to the increase in auxiliary reservoir pressure, moves the control valve pistons 18, 19, 20 and 21 and slide valve 2 back to their intermediate position in which fluid under pressure is again permitted to release from the brake cylinder at the same time as fluid under pressure is supplied to the auxiliary reservoir.

It will now be evident, that the release of fluid under pressure from the brake cylinder depends upon the charging of the auxiliary reservoir, also, the charging of the auxiliary reservoir depends upon the venting of fluid under pressure from the brake cylinder, in other words, the graduated release valve device operates, in effecting a release of the brakes, to maintain a predetermined relation between brake cylinder pressure and auxiliary reservoir pressure.

If, however, it is desired to graduate the release of brakes, the brake pipe pressure is increased only an amount sufficient to effect the desired reduction in brake cylinder pressure. The auxiliary reservoir pressure is increased a degree corresponding to the degree of increase in brake pipe pressure and the auxiliary reservoir pressure reducer 29 operates to increase the pressure in the control valve slide valve chamber 23 a degree proportional to the degree of increase in auxiliary reservoir pressure. Now, as the brake cylinder pressure acting in the control valve piston chamber 22 continues to reduce through the brake cylinder exhaust cavity 3 in the slide valve 2, the reduced, but constant pressure acting in the control chamber 24 overcomes the opposing reduced pressure acting in chamber 23 on the differential areas of pistons 19 and 20 plus brake cylinder pressure acting on piston 18 and moves said pistons and the slide valve 2 upwardly until piston 18 strikes the casing. In this position of piston 18, port 7 is lapped by the slide valve 2 so as to prevent further release of fluid under pressure from the brake cylinder D, but communication is maintained between ports 10 and 14 in order to permit a further increase in auxiliary reservoir pressure and consequently a further release of brakes when desired.

In order to effect a further reduction in brake cylinder pressure, another increase in brake pipe pressure is effected. Fluid under pressure then flows from the brake pipe to the triple valve device, thence through the valve chamber B in the triple valve device, passage 13, cavity 51 in the cut-off valve slide valve 50 to passage 11, then through port 10, cavity 4 in the control valve slide valve 2, passage 14, past the check valve 15 to passage 44 and from thence to the auxiliary reservoir C and to the chamber above the smaller diaphragm 35. The auxiliary reservoir pressure reducer then operates as hereinbefore described to increase the pressure in the control valve slide valve chamber 23 an amount proportional to the increase in auxiliary reservoir pressure.

The increase in pressure in the control valve chamber 23 acting on the differential areas of pistons 19 and 20 plus the brake cylinder pressure acting on piston 18 then overcomes the opposing pressures acting in the control chamber 24 on piston 21 and moves the control slide valve 2 downwardly to the intermediate position in which fluid under pressure is again vented from the brake cylinder until the brake cylinder pressure is reduced to a degree proportional to the pressure obtained in the auxiliary reservoir.

It will now be evident that fluid under pressure may be vented from the brake cylinder in steps proportionate to the degree of increase in brake pipe pressure in order to effect a graduated release of the brakes. When the brake cylinder pressure is thus reduced to a predetermined low degree, auxiliary reservoir pressure acting in chamber 33 below the piston 31 of the auxiliary reservoir pressure reducer 29 moves the pistons 31 and 30 upwardly to the position shown in the drawings against the opposing reduced brake cylinder pressure in chamber 32 acting on the upper side of piston 30. In the upper position of piston 30, passage 45 is opened to the chamber at the lower side of said piston so that fluid under pressure supplied from the brake cylinder D through the triple valve device to passage 9 and from thence through chamber 32 to passage 8 is vented to the atmosphere through passages 45 and 58 and the atmospheric passage 67 thereby ensuring, independently of the control valve slide 2, the final release of fluid under pressure from the brake cylinder.

The control reservoir pressure reducer 28 operates in the same manner as the auxiliary reservoir pressure reducer 29 when the brake cylinder pressure is reduced to a predetermined low degree.

In the upper position of the pressure reducer pistons 31, fluid under pressure is vented from the chamber at the upper side of diaphragm 35 through passage 41, the chamber at the lower side of piston 30 and atmospheric passage 58, thereby ensuring seating of the valve 38.

With the control reservoir reducing valve 38 seated, fluid under pressure is vented from the chamber below diaphragm 34 and from the connected control chamber 24 by way of leakage past the piston 21 and through the atmospheric passage 68. With the auxiliary reservoir reducing valve 38 seated, fluid under pressure is vented from the chamber below the diaphragm 34 and from the connected valve chamber 23 by leakage past the piston 19 and thence through the atmospheric passage 66 and also, until the piston 20 moves to the position shown in the drawings, by leakage past the piston 20 and through the atmospheric passage 68. When the pressures in the control valve piston chambers 24 and 23 are thus reduced to substantially that of the atmosphere, the pistons 18, 19, 20 and 21 and slide valve 2 settle to the lower position, shown in the drawings, due to the action of gravity.

The chamber at the lower side of the cut-off valve piston 46 is vented to the atmosphere when the auxiliary reservoir pressure reducing valve pistons 30 and 31 move to their upper positions, by way of passages 52 and 41, through the chamber at the lower side of piston 30 and from thence through passage 58 and atmospheric passage 67. Auxiliary reservoir pressure acting in the valve chamber 47 at the opposite side of the cut-off valve piston then moves said piston and the slide valve 50 to the lower position in which the triple valve chamber B is connected directly through passage 13, the chamber containing slide valve 50 and passage 16 to the auxiliary reservoir C so that when another application of the brakes is effected, direct flow of fluid under pressure from the auxiliary reservoir to the triple valve chamber B will be permitted.

Referring now to the modified form of my invention shown in Fig. 2, the slide valve 2 of the control valve is disposed in a chamber 59 which is at all times open to the control reservoir 25 through a passage 60. The slide valve 2 is adapted to be operated by the shorter arm 61 of a two armed lever 62 pivoted in the body or casing 1. The longer arm 63 of the lever 62 is subject on one side to the operation of pistons 18 and 20 and on the opposite side to the operation of piston 21. The piston 18 is provided with a chamber 22 at one side adapted to be supplied with fluid under pressure from the brake cylinder in effecting a release of the brakes. The opposite side of piston 18 is open to a chamber 69 which is at all times vented to the atmosphere through passages 70 and 36. The piston 20 is open at one side to the vented chamber 69 and is provided at the opposite side with a chamber 64 to which fluid at a pressure proportional to the auxiliary reservoir pressure is supplied by operation of the auxiliary reservoir pressure reducer 29 in effecting a release of the brakes. The piston 21 is also open at one side to the vented chamber 69, while the chamber 24 at the opposite side is adapted to be supplied with fluid at a pressure proportional to the pressure in the control reservoir 25 by operation of the control reservoir pressure reducer 28 in effecting a release of the brakes.

When the brake system embodying the modified form of my invention is void of fluid under pressure, the slide valve 2 may be in the position shown in the drawings, while the pistons 30 and 31 of the pressure reducers 28 and 29 will be in their lower position, due to the action of gravity, as described in connection with the form of the invention shown in Fig. 1.

In operation, in initially charging the brake equipment, fluid under pressure from valve chamber B of the triple valve device A is supplied to passage 13 in the graduated release valve device and flows from thence through port 10, cavity 4 in slide valve 2, through port 14 to the chamber at the lower side of piston 31 in the auxiliary reservoir pressure reducer 29 and from thence through passage 16 to the auxiliary reservoir C. Fluid at auxiliary reservoir pressure acting in the chamber below the auxiliary reservoir pressure reducer piston 31 then shifts said piston and the piston 30 to their upper position.

Fluid under pressure also flows from passage 13 past the check valve 55 to the supplementary reservoir 26, and past the check valve 56 to the slide valve chamber 59 and from thence through passage 60 to the control reservoir 25 and to the chamber at the lower side of piston 31 in the control reservoir pressure reducer 28 and moves said piston and the piston 30 to their upper position. The chambers at the upper sides of the pressure reducer pistons 30 and the chamber 22 at one side of piston 18 are connected together as in the construction shown in Fig. 1 and are normally open to the atmosphere through port 7, cavity 3 in slide valve 2 and the atmospheric port 6.

In effecting an application of the brakes, fluid under pressure is drawn from the auxiliary reservoir C to the triple valve chamber B for supplying to the brake cylinder D by way of passage 16, through the chamber at the lower side of piston 31 in the auxiliary reservoir pressure reducer 29, past the check valve 65 and through passage 13, the check valve 65 being provided to prevent direct charging of the auxiliary reservoir C, i. e. independently of the slide valve 2 in effecting a graduated release of the brakes as will be hereinafter described.

In effecting a release of the brakes, fluid under pressure is vented from the brake cylinder D through the triple valve device A to passage 9 in the graduated release valve device and from passage 9 flows to the chamber at the upper side of the pistons 30 of the pressure reducers 28 and 29, to the chamber 22 at one side of piston 18 and also to port 7 and from thence through cavity 3 in slide valve 2 and through the passage 6 to the atmosphere.

Fluid at brake cylinder pressure supplied to piston chamber 22 operates the piston 18 to rotate the lever 62 in a clockwise direction. This rotation of lever 62 shifts the slide valve 2 towards the right hand and laps port 10, so that fluid under pressure being supplied from the triple valve chamber B to passage 13 is not permitted to flow to the auxiliary reservoir C.

Fluid at brake cylinder pressure supplied to the chamber above the pistons 30 of the pressure reducers 28 and 29 operate said pressure reducers in the same manner as described in connection with the construction shown in Fig. 1, the control reservoir pressure reducer 28 operating to supply fluid at a reduced pressure from the supplemental reservoir 26 to chamber 24 at one side of the piston 21, while the auxiliary reservoir pressure reducer 29 operates to supply fluid at a reduced pressure from the supplemental reservoir 26 to chamber 64 at one side of the piston 20. Now, the longer arm 63 of lever 62 is subject on one side to brake cylinder pressure acting on piston 18 and a reduced pressure, proportional to auxiliary reservoir pressure, acting on the piston 20, the pressures acting on pistons 18 and 20 being opposed by the reduced pressure, proportional to control reservoir pressure, acting on the piston 21.

The slide valve 2 is initially moved to its right hand position to lap the auxiliary reservoir charging port 10 as hereinbefore described, but as fluid is vented from the brake cylinder and a consequent reduction in pressure occurs on the piston 18, the pressure on piston 21 rotates lever 62 in a counter-clockwise direction and moves slide valve 2 to the intermediate position shown in Fig. 2.

In the intermediate position of slide valve 2, fluid flows from port 10 through cavity 4 and passage 14 to the chamber at the lower side of the auxiliary reservoir pressure reducer piston 31 and from thence through passage 16 to the auxiliary reservoir C and at the same time fluid under pressure continues to be vented from the brake cylinder. If the rate of increase in auxiliary reservoir pressure bears the proper relation to the rate of reduction in brake cylinder pressure, the increase in pressure in chamber 64 acting on piston 20 compensates for the reduction in brake cylinder pressure in chamber 22 acting on the piston 18 and the lever 62 and slide valve 2 are maintained in their intermediate position. However, if the rate of increase in pressure in the auxiliary reservoir and consequently in piston chamber 64 is too rapid as compared to the rate of reduction in brake cylinder pressure, the pressure of fluid on pistons 20 and 18 overcomes the opposing pressure on piston 21 and rotates the lever 62 in a clockwise direction. This rotation of lever 62 shifts the slide valve 2 toward the right hand, lapping passage 10 so as to cut off the supply of fluid under pressure to the auxiliary reservoir without interrupting the venting of fluid under pressure from the brake cylinder. Now when the brake cylinder pressure is reduced to a degree bearing the proper relation to the pressure acting in the auxiliary reservoir, the reduced brake cylinder pressure acting on piston 18 plus the pressure acting on piston 20 is overcome by the reduced but constant pressure acting on piston 21 and piston 21 rotates the lever 62 in a counter-clockwise direction. The consequent movement of the slide valve 2 toward the left hand uncovers the port 10 so that fluid under pressure is again supplied to the auxiliary reservoir as fluid under pressure is being vented from the brake cylinder.

When the slide valve 2 is in the intermediate position, if the brake cylinder pressure reduces too rapidly as compared to the rate of increase in auxiliary reservoir pressure, the reduced pressure, proportional to control reservoir pressure, acting on piston 21 overcomes the opposing reduced pressure acting on piston 20 plus the too rapidly reducing brake cylinder pressure acting on the piston 18 and rotates the lever 62 in a counter-clockwise direction. The slide valve 2 is thereby moved towards the left hand so as to lap the brake cylinder release port 7 without interrupting the supply of fluid under pressure to the auxiliary reservoir. Then when the auxiliary reservoir becomes charged to a pressure corresponding to the reduced brake cylinder pressure, the proportionate increase in the pressure acting on the piston 20 rotates the lever 62 and moves the slide valve 2 back to the intermediate position in which fluid under pressure is again vented from the brake cylinder as fluid under pressure is supplied to the auxiliary reservoir.

In the manner just described, a predetermined relation is maintained between the brake cylinder pressure and auxiliary reservoir in effecting a release of the brakes upon a continuous increase in brake pipe pressure.

If it is desired to graduate the release of the brakes, the brake pipe pressure is increased only a predetermined degree such as is required to effect the desired reduction in brake cylinder pressure. As the auxiliary reservoir pressure is being increased to correspond to the increase in brake pipe pressure and the reduced pressure in chamber 64 is also being increased in proportion to the increase in auxiliary reservoir pressure, fluid under pressure is being vented from the brake cylinder. Fluid under pressure continues to vent from the brake cylinder until the brake cylinder pressure acting on piston 18 becomes reduced to a degree sufficient for the pressure acting on piston 21 to rotate the lever 62 in a counter-clockwise direction against the opposing pressures acting on pistons 18 and 20. The consequent movement of slide valve 2 towards the left hand laps the brake cylinder release port 7 so as to prevent a further release of the brakes.

In order to effect a further release of the brakes, the brake pipe pressure is again increased and a corresponding increase in pressure in the auxiliary reservoir and in piston chamber 64 results. The increase in pressure in chamber 64 operates the piston 20 to rotate the lever 62 in a clockwise direction and shift the slide valve 2 towards the right hand. This movement of the slide valve 2 uncovers port 7 so that a further release of fluid under pressure from the brake cylinder is permitted to occur. Then when the brake cylinder pressure is reduced to a degree corresponding to the increase in auxiliary reservoir pressure, the slide valve 2 is again operated to lap the brake cylinder release port 7. In this manner the slide valve 2 may be operated to reduce the brake cylinder pressure in steps according to the degree of increase in auxiliary reservoir pressure.

When the brake cylinder pressure is reduced to a predetermined low degree, auxiliary reservoir pressure acting in the chamber at the lower side of piston 31 in the auxiliary reservoir pressure reducer 29 moves the pistons 30 and 31 to the upper position shown in the drawings for effecting the final release of fluid under pressure from the brake cylinder as described in connection with the construction shown in Fig. 1. The pistons 30 and 31 of the control reservoir pressure reducer 28 are also moved to their upper position by control reservoir pressure acting on piston 31 upon the substantially complete release of fluid under pressure from the brake cylinder. With the pressure reducers 28 and 29 thus in their normal positions, fluid under pressure is vented from the piston chambers 24 and 64 by leakage past the pistons 21 and 20 respectively.

It will be noted that, since in effecting a release of the brakes, the pressure reducers 28 and 29 operate to supply fluid at a reduced pressure for controlling the operation of the graduated release control valve pistons, and then maintain the correct pressure on said pistons, said pistons may be sufficiently loosely fitting in their cylinders as to be sensitive in operation. Further, due to the fact that the control valve pistons are subject to fluid only at a reduced pressure and only while effecting a release of the brakes, leakage of fluid under pressure past said pistons is reduced to a minimum.

While several illustrative embodiments of the invention have been described in detail, it is not our intention to limit its scope to these embodiments or otherwise than by the terms of the appended claims.

Having now described our invention, what we claim as new and desire to secure by Letters Patent, is:

1. In a fluid pressure brake, the combination with a brake cylinder, and an auxiliary reservoir, of a graduated release valve device operated in accordance with the reduction in brake cylinder pressure and the increase in a reduced pressure proportional to the pressure in the auxiliary reservoir for controlling the supply of fluid under pressure to said auxiliary reservoir and the release of fluid under pressure from said brake cylinder.

2. In a fluid pressure brake, the combination with a brake cylinder, and an auxiliary reservoir, of a graduated release valve device comprising valve means for controlling the supply of fluid under pressure to the auxiliary reservoir and the release of fluid under pressure from the brake cylinder, and a plurality of movable abutments operated in accordance with the reduction in brake cylinder pressure and the increase in a pressure proportional to the auxiliary reservoir pressure for controlling the operation of said valve means.

3. In a fluid pressure brake, the combination with a brake cylinder, and an auxiliary reservoir, of a graduated release valve device comprising valve means for controlling the supply of fluid under pressure to the auxiliary reservoir and the release of fluid under pressure from the brake cylinder, and a plurality of movable abutments controlled by the opposing pressures of the brake cylinder plus a reduced pressure proportional to the auxiliary reservoir pressure, and a constant pressure for controlling the operation of said valve means.

4. In a fluid pressure brake, the combination with a brake cylinder, and an auxiliary reservoir, of a graduated release valve device operative to supply fluid under pressure to said auxiliary reservoir and to vent fluid under pressure from said brake cylinder in accordance with the increase in pressure in said auxiliary reservoir, and a plurality of movable abutments for controlling said graduated release valve device, said abutments being controlled by the opposing pressures of the brake cylinder plus a reduced pressure proportional to auxiliary reservoir pressure, and a constant pressure.

5. In a fluid pressure brake, the combination with a brake cylinder, and an auxiliary reservoir, of a graduated release valve device operative to vent fluid under pressure from said brake cylinder and to supply fluid under pressure to said auxiliary reservoir in accordance with the reduction in brake cylinder pressure, and a plurality of movable abutments for controlling said graduated release valve device, said abutments being operated in accordance with the relation between brake cylinder pressure, a pressure proportional to auxiliary reservoir pressure and a constant pressure.

6. In a fluid pressure brake, the combination with a brake cylinder, an auxiliary reservoir, and a control reservoir charged with fluid at a constant pressure, of a graduated release valve operative to supply fluid under pressure to said auxiliary reservoir and to vent fluid under pressure from said brake cylinder in accordance with the increase in auxiliary reservoir pressure, and a plurality of movable abutments for controlling the operation of said graduated release valve, said abutments being governed by the reduction in brake cylinder pressure, the increase in a pressure proportional to auxiliary reservoir pressure, and a constant pressure proportional to the pressure in said control reservoir.

7. In a fluid pressure brake, the combination with a brake cylinder, an auxiliary reservoir, and a control reservoir charged with fluid at a constant pressure, of a graduated release valve operative to supply fluid under pressure to said auxiliary reservoir and to vent fluid under pressure from said brake cylinder in accordance with the increase in auxiliary reservoir pressure, a plurality of movable abutments for controlling the operation of said graduated release valve, said abutments being governed by the reduction in brake cylinder pressure and a reduced pressure proportional to auxiliary reservoir pressure acting in opposition to a reduced pressure proportional to the pressure in said control reservoir, and valve means operated by brake cylinder pressure for supplying fluid at a reduced pressure to said abutments for controlling the operation thereof.

8. In a fluid pressure brake, the combination with a brake cylinder, an auxiliary reservoir, and a control reservoir charged with fluid at a constant pressure, of a graduated release valve device comprising movable valve means having an intermediate position for venting fluid under pressure from said brake cylinder and for supplying fluid under pressure to said auxiliary reservoir, another position at one side of said intermediate position for only supplying fluid under pressure to said auxiliary reservoir, and a third position at the opposite side of said intermediate position for only venting fluid under pressure from said brake cylinder, and a plurality of movable abutments controlled by the pressure of fluid in said brake cylinder, a pressure proportional to the pressure in said auxiliary reservoir and a third pressure proportional to the pressure in said control reservoir for controlling the position to which said valve means is moved.

9. In a fluid pressure brake, the combination with a brake cylinder, an auxiliary reservoir, and a control reservoir charged with fluid at a constant pressure, of valve means for venting fluid under pressure from said brake cylinder and for supplying fluid under pressure to said auxiliary reservoir, a plurality of movable abutments for controlling the operation of said valve means, said abutments being controlled by fluid under pressure from said brake cylinder and a pressure proportional to the pressure in said auxiliary reservoir acting in opposition to a pressure proportional to the pressure in said control reservoir, and reducing valve means for supplying fluid at pressures proportional to the pressure in said auxiliary reservoir and the pressure in said control reservoir to said abutments.

10. In a fluid pressure brake, the combination with a brake cylinder, an auxiliary reservoir, and a control reservoir charged with fluid at a constant pressure, of a graduated release valve for supplying fluid under pressure to said auxiliary reservoir and for venting fluid under pressure from said brake cylinder in accordance with the increase in auxiliary reservoir pressure, means for controlling the operation of said graduated release valve comprising a plurality of connected movable abutments, one of said abutments being subject to the pressure of fluid in said brake cylinder, another of said abutments being subject to a reduced pressure proportional to the auxiliary reservoir pressure and a third of said abutments being subject to a reduced constant pressure proportional to the constant pressure in said control reservoir, and reducing valve means controlled by the pressures in said auxiliary reservoir and said control reservoir for supplying fluid at the reduced pressures to the second and third mentioned abutments.

11. In a fluid pressure brake, the combination with a brake cylinder, an auxiliary reservoir, and a control reservoir charged with fluid at a constant pressure, of a graduated release valve for supplying fluid under pressure to said auxiliary reservoir and for venting fluid under pressure from said brake cylinder in accordance with the increase in auxiliary reservoir pressure, means for controlling the operation of said graduated release valve comprising a plurality of connected movable abutments, one of said abutments being subject to the pressure of fluid in said brake cylinder, another of said abutments being subject to a reduced pressure proportional to the auxiliary reservoir pressure and a third of said abutments being subject to a reduced constant pressure proportional to the constant pressure in said control reservoir, and reducing valve means for supplying fluid at the reduced pressures to the second and third mentioned abutments, and means operated by brake cylinder pressure in effecting a release of the brakes for controlling the operation of said reducing valve means.

12. In a fluid pressure brake, the combination with a brake cylinder, an auxiliary reservoir, and a control reservoir charged with fluid at a constant pressure, of a graduated release valve for supplying fluid under pressure to said auxiliary reservoir and for venting fluid under pressure from said brake cylinder in accordance with the increase in auxiliary reservoir pressure, means for controlling the operation of said graduated release valve comprising a plurality of connected movable abutments, one of said abutments being subject to the pressure of fluid in said brake cylinder, another of said abutments being subject to a reduced pressure proportional to the auxiliary reservoir pressure and a third of said abutments being subject to a reduced constant pressure proportional to the constant pressure proportional to the constant pressure in said control reservoir, and reducing valve means for supplying fluid at the reduced pressures to the second and third mentioned abutments, and means operated by brake cylinder pressure in effecting a release of the brakes for controlling the operation of said reducing valve means, the last mentioned means being operative upon a predetermined reduction in brake cylinder pressure to vent fluid under pressure from said brake cylinder independently of said graduated release valve.

13. In a fluid pressure brake, the combination with a brake cylinder, an auxiliary reservoir, and a control reservoir charged with fluid at a constant pressure, of a graduated release valve operative in effecting a release of the brakes to supply fluid under pressure to said auxiliary reservoir and to vent fluid under pressure from said brake cylinder in accordance with the increase in auxiliary reservoir pressure, and means subject to and controlled by the pressure of fluid in said control reservoir and variations in pressure in said auxiliary reservoir and brake cylinder, only when effecting a release of the brakes, for governing the operation of said graduated release valve.

14. In a fluid pressure brake, the combination with a brake pipe, a brake cylinder, an auxiliary reservoir, and a control reservoir charged with fluid at a constant pressure, of a graduated release valve device controlled by the pressures in the brake cylinder and said reservoirs for controlling the supply of fluid under pressure to said auxiliary reservoir and the venting of fluid under pressure from said brake cylinder, and a triple valve device controlled by variations in brake pipe pressure and operated upon an increase in brake pipe pressure to render the pressures in said brake cylinder and reservoirs effective on said graduated release valve device for controlling the operation of said graduated release valve device.

15. In a fluid pressure brake, the combination with a brake pipe, a brake cylinder, an auxiliary reservoir, and a control reservoir charged with fluid at a constant pressure, of a graduated release valve device controlled by the pressures in the brake cylinder and said reservoirs for controlling the supply of fluid under pressure to said auxiliary reservoir and the venting of fluid under pressure from said brake cylinder, a triple valve device controlled by variations in brake pipe pressure and operated upon an increase in brake pipe pressure to establish a communication through which fluid under pressure is supplied from the brake cylinder to said graduated release valve device, and valve means operated by fluid under pressure supplied through said communication for rendering the pressures in said reservoirs effective to control the operation of said graduated release valve device.

16. In a fluid pressure brake, the combination with a brake pipe, a brake cylinder, an auxiliary reservoir, and a control reservoir charged with fluid at a constant pressure, of a graduated release valve device controlled by the pressures in the brake cylinder and said reservoirs for controlling the supply of fluid under pressure to said auxiliary reservoir and the venting of fluid under pressure from said brake cylinder, a triple valve device controlled by variations in brake pipe pressure and operated upon an increase in brake pipe pressure to establish a communication through which fluid under pressure is supplied from the brake cylinder to said graduated release valve device, and valve means operated by fluid under pressure supplied through said communication for rendering the pressures in said reservoirs effective to control the operation of said graduated release valve device, said valve means being operative when the brake cylinder pressure is reduced to a predetermined degree for opening said communication to the atmosphere independently of said graduated release valve device.

17. In a fluid pressure brake, the combination with a brake pipe, an auxiliary reservoir, a control reservoir charged with fluid at a constant pressure and a brake cylinder, of a triple valve device operated upon a reduction in brake pipe pressure to supply fluid under pressure from said auxiliary reservoir to said brake cylinder to effect an application of the brakes and operated upon an increase in brake pipe pressure to establish a communication through which fluid under pressure is adapted to be supplied from said brake pipe to said reservoirs and another communication through which fluid under pressure is adapted to be vented from said brake cylinder to effect a release of the brakes, a graduated release valve device for supplying fluid under pressure from the first mentioned communication to said auxiliary reservoir and for opening the second mentioned communication to the atmosphere for venting fluid under pressure from said brake cylinder, said graduated release valve device being controlled by fluid under pressure from the brake cylinder and reduced pressures proportional to the pressures in said reservoirs for venting fluid under pressure from the brake cylinder in accordance with the increase in pressure in said auxiliary reservoir, and valve means operated by fluid under pressure from said brake cylinder for supplying fluid at reduced pressures proportional to the pressures in said reservoirs to said graduated release valve device, said valve means being operated upon a predetermined reduction in brake cylinder pressure to cut-off the supply of fluid at reduced pressures to said graduated release valve device and to establish another communication through which fluid under pressure is vented from said brake cylinder to the atmosphere independently of said graduated release valve device.

18. In a fluid pressure brake, the combination with a brake pipe, an auxiliary reservoir, a control reservoir charged with fluid at a constant pressure and a brake cylinder, of a triple valve device operated upon a reduction in brake pipe pressure to supply fluid under pressure from said auxiliary reservoir to said brake cylinder to effect an application of the brakes and operated upon an increase in brake pipe pressure to establish a communication through which fluid under pressure is adapted to be supplied from said brake pipe to said reservoirs and another communication through which fluid under pressure is adapted to be vented from said brake cylinder to effect a release of the brakes, a graduated release valve having an intermediate position for supplying fluid under pressure from the first mentioned communication to the auxiliary reservoir and for venting fluid under pressure from the brake cylinder through the second mentioned communication to the atmosphere, said graduated release valve being movable to a position at one side of said intermediate position for interrupting the venting of fluid under pressure from said brake cylinder and being movable to a position at the opposite side of said intermediate position for interrupting the supply of fluid under pressure to the auxiliary reservoir, a plurality of movable abutments for moving said graduated release valve to its different positions, one of said abutments being subject on one side to brake cylinder pressure supplied through the second mentioned communication, reducing valve means operated by fluid under pressure from the auxiliary reservoir for supplying fluid at a reduced pressure proportional to auxiliary reservoir pressure to one side of another of said abutments, other reducing valve means operated by fluid under pressure from the control reservoir for supplying fluid at a reduced pressure proportional to control reservoir pressure to one side of still another of said abutments for opposing movement of said valve by the pressure of fluid acting on the two first mentioned abutments, and piston controlled means operated by fluid under pressure supplied from the brake cylinder to the second mentioned communication for effecting the operation of both of said reducing valve means, said piston controlled means being operative when the brake cylinder pressure is reduced to a predetermined degree to render both of said reducing valve means inoperative to supply fluid at reduced pressure to the second and third mentioned abutments.

19. In a fluid pressure brake, the combination with a brake pipe, an auxiliary reservoir, a control reservoir charged with fluid at a constant pressure and a brake cylinder, of a triple valve device operated upon a reduction in brake pipe pressure to supply fluid under pressure from said auxiliary reservoir to said brake cylinder to effect an application of the brakes and operated upon an increase in brake pipe pressure to establish a communication through which fluid under pressure is adapted to be supplied from said brake pipe to said reservoirs and another communication through which fluid under pressure is adapted to be vented from said brake cylinder to effect a release of the brakes, a graduated release valve having an intermediate position for supplying fluid under pressure from the first mentioned communication to the auxiliary reservoir and for venting fluid under pressure from the brake cylinder through the second mentioned communication to the atmosphere, said graduated release valve being movable to a position at one side of said intermediate position for interrupting the venting of fluid under pressure from said brake cylinder and being movable to a position at the opposite side of said intermediate position for interrupting the supply of fluid under pressure to the auxiliary reservoir, a plurality of movable abutments for moving said graduated release valve to its different positions, one of said abutments being subject on one side to brake cylinder pressure supplied through the second mentioned communication, reducing valve means operated by fluid under pressure from the auxiliary reservoir for supplying fluid at a reduced pressure proportional to auxiliary reservoir pressure to one side of another of said abutments, other reducing valve means operated by fluid under pressure from the control reservoir for supplying fluid at a reduced pressure proportional to control reservoir pressure to one side of still another of said abutments for opposing movement of said valve by the pressure of fluid acting on the two first-mentioned abutments, piston controlled means operated by fluid under pressure supplied from the brake cylinder to the second mentioned communication for effecting the operation of both of said reducing valve means, said piston controlled means being operative when the brake cylinder pressure is reduced to a predetermined degree to render both of said reducing valve means inoperative to supply fluid at reduced pressure to the second and third mentioned abutments, said auxiliary reservoir being normally open directly to the triple valve device through the first mentioned communication and valve means operated in effecting a release of the brakes for closing the direct communication from said auxiliary reservoir to said triple valve device.

20. In a fluid pressure brake, the combination with a brake pipe, an auxiliary reservoir, a control reservoir charged with fluid at a constant pressure and a brake cylinder, of a triple valve device operated upon a reduction in brake pipe pressure to supply fluid under pressure from said auxiliary reservoir to said brake cylinder to effect an application of the brakes and operated upon an increase in brake pipe pressure to establish a communication through which fluid under pressure is adapted to be supplied from said brake pipe to said reservoirs and another communication through which fluid under pressure is adapted to be vented from said brake cylinder to effect a release of the brakes, a graduated release valve having an intermediate position for supplying fluid under pressure from the first mentioned communication to the auxiliary reservoir and for venting fluid under pressure from the brake cylinder through the second mentioned communication to the atmosphere, said graduated release valve being movable to a position at one side of said intermediate position for interrupting the venting of fluid under pressure from said brake cylinder and being movable to a position at the opposite side of said intermediate position for interrupting the supply of fluid under pressure to the auxiliary reservoir, a plurality of movable abutments for moving said graduated release valve to its different positions, one of said abutments being subject on one side to brake cylinder pressure supplied through the second mentioned communication, reducing valve means operated by fluid under pressure from the auxiliary reservoir for supplying fluid at a reduced pressure proportional to auxiliary reservoir pressure to one side of another of said abutments, other reducing valve means operated by fluid under pressure from the control reservoir for supplying fluid at a reduced pressure proportional to control reservoir pressure to one side of still another of said abutments for opposing movement of said valve by the pressure of fluid acting on the two first mentioned abutments, piston controlled means operated by fluid under pressure supplied from the brake cylinder to the second mentioned communication for effecting the operation of both of said reducing valve means, said piston controlled means being operative when the brake cylinder pressure is reduced to a predetermined degree to render both of said reducing valve means inoperative to supply fluid at reduced pressure to the second and third mentioned abutments, and valve means other than said graduated release valve for controlling a direct communication between said auxiliary reservoir and triple valve device, said valve means being controlled by said piston controlled means and operative upon the operation of said reducing valve means to supply fluid under pressure for controlling the operation of the second and third mentioned abutments to close said direct communication, said valve means being operative upon rendering the reducing valve means inoperative to open said direct communication.

21. In a fluid pressure brake, the combination with a brake pipe, a brake cylinder and an auxiliary reservoir, of a triple valve device operative upon a reduction in brake pipe pressure to supply fluid under pressure from said auxiliary reservoir to said brake cylinder to effect an application of the brakes and operative upon an increase in brake pipe pressure to establish a charging communication through which fluid under pressure is adapted to be supplied from said brake pipe to said auxiliary reservoir and to establish a release communication through which fluid under pressure is adapted to be vented from said brake cylinder, a control reservoir charged through a one-way flow passage with fluid under pressure from said brake pipe, a supplementary reservoir charged through a one-way flow passage with fluid under pressure from said brake pipe, a graduated release valve controlled by the pressure of fluid in said brake cylinder and reduced pressures proportional to the pressures in said control reservoir and auxiliary reservoir for supplying fluid under pressure from said charging communication to said auxiliary reservoir and for venting fluid under pressure from said brake cylinder through said release communication in accordance with the increase in auxiliary reservoir pressure, reducing valve means actuated by auxiliary reservoir pressure for supplying fluid at a lower pressure than auxiliary reservoir pressure from said supplementary reservoir to said graduated release valve, reducing valve means actuated by control reservoir pressure for supplying fluid at a lower pressure than control reservoir pressure from said supplementary reservoir to said graduated release valve, valve means operated by fluid supplied from the brake cylinder through said triple valve device for supplying fluid under pressure from the auxiliary reservoir and the control reservoir to actuate said reducing valve means, said valve means being operative when the brake cylinder pressure is reduced to a predetermined low degree for venting the actuating fluid from said reducing valve means and for opening said release communication directly to the atmosphere.

22. In a fluid pressure brake, the combination with a brake cylinder, an auxiliary reservoir, and a control reservoir charged with fluid at a constant pressure, of valve means operated in effecting a release of the brakes for supplying fluid under pressure to said auxiliary reservoir and for venting fluid under pressure from said brake cylinder in accordance with the increase in auxiliary reservoir pressure, said valve means being controlled by brake cylinder pressure and reduced pressures proportional to the pressures in said auxiliary reservoir and control reservoir, said valve means comprising a slide valve movable to various controlling positions for supplying fluid under pressure to the auxiliary reservoir and for venting fluid under pressure from the brake cylinder, a plurality of abutments subject on one side to atmospheric pressure, a stem connecting said abutments to said slide valve, one of said abutments being subject on one side to variations in brake cylinder pressure, reducing valve means operated by fluid under pressure from said brake cylinder for supplying fluid at a reduced pressure proportional to the pressure in said control reservoir to another of said abutments, another reducing valve means operated by fluid under pressure from said brake cylinder for supplying fluid at a reduced pressure proportional to the pressure in said auxiliary reservoir to another of said abutments, both of said reducing valve means being operative to maintain the pressure on the last two mentioned abutments against leakage therefrom and operative upon a predetermined reduction in brake cylinder pressure to cut off the supply of fluid under pressure to said last two mentioned abutments, one of said reducing valve means being operative upon cutting off the supply of fluid to its slide valve operating abutment to vent fluid under pressure from said brake cylinder independently of said valve means.

23. In a fluid pressure brake, the combination with a brake cylinder, an auxiliary reservoir, and a control reservoir charged with fluid at a constant pressure, of valve means operated in effecting a release of the brakes for supplying fluid under pressure to said auxiliary reservoir and for venting fluid under pressure from said brake cylinder in accordance with the increase in auxiliary reservoir pressure, said valve means being controlled by brake cylinder pressure and reduced pressures proportional to the pressures in said auxiliary reservoir and control reservoir, said valve means comprising a slide valve movable to various controlling positions for supplying fluid under pressure to the auxiliary reservoir and for venting fluid under pressure from the brake cylinder, a lever for moving said slide valve to its various positions, a movable abutment acting on said lever and subject on one side to atmospheric pressure and on the opposite side to variations in brake cylinder pressure, another movable abutment acting on said lever and subject on one side to atmospheric pressure and on the opposite side to an actuating pressure, a control reservoir pressure reducing valve means operated by brake cylinder pressure for supplying fluid at a reduced pressure proportional to control reservoir pressure to actuate the last mentioned abutment, a third movable abutment acting on said lever and subject on one side to atmospheric pressure and on the opposite side to an actuating pressure, an auxiliary reservoir pressure reducing valve means operated by brake cylinder pressure for supplying fluid at a reduced pressure proportional to auxiliary reservoir pressure to actuate the last mentioned abutment, both of said pressure reducing valve means being operative to maintain the actuating pressures on the last two mentioned abutments against leakage therefrom and operative upon a predetermined reduction in brake cylinder pressure to cut off the supply of fluid under pressure to said two last mentioned abutments, one of said pressure reducing valve means being also operative upon a predetermined reduction in brake cylinder pressure to vent fluid under pressure from said brake cylinder independently of said valve means.

24. In a fluid pressure brake, the combination with a brake pipe, a brake cylinder, an auxiliary reservoir, a supplementary reservoir and a control reservoir charged with fluid at a constant pressure, of a triple valve device operative upon a reduction in brake pipe pressure to supply fluid under pressure from said auxiliary reservoir to said brake cylinder to effect an application of the brakes and operative upon an increase in brake pipe pressure to establish a communication through which fluid under pressure is supplied to said auxiliary reservoir and another communication through which fluid under pressure is vented from said brake cylinder to effect a release of the brakes, a graduated release valve device operative in accordance with the pressure in said brake cylinder, auxiliary reservoir and control reservoir for controlling the supply of fluid under pressure from said triple valve device to said auxiliary reservoir and the venting of fluid under pressure from said brake cylinder, valve means operated by brake cylinder pressure for supplying fluid from said supplementary reservoir to said graduated release valve device at pressures proportional to the pressures in said control reservoir and auxiliary reservoir, said valve means being operative when the pressure in said brake cylinder is reduced to a predetermined degree to cut off the supply of fluid under pressure from said supplementary reservoir to said graduated release valve device and to establish a communication for venting fluid under pressure from said brake cylinder independently of said graduated release valve device, and a cut-off valve device controlled by said valve means and normally establishing a direct communication from said auxiliary reservoir to said triple valve device and operative upon the operation of said valve means to supply fluid under pressure for controlling the operation of said graduated release valve device to close said direct communication and establish another communication from said triple valve device to said graduated release valve device so that the supply of fluid under pressure to said auxiliary reservoir is controlled by said graduated release valve device.

ANSELME NEVEU.
JEAN GUILLEMIN-TARAYRE.